(12) United States Patent
Kondguli et al.

(10) Patent No.: US 11,416,961 B2
(45) Date of Patent: Aug. 16, 2022

(54) VARIABLE ENTRY TRANSITIONAL RING STORAGE FOR EFFICIENTLY ACCESSING GRAPHICS STATES

(71) Applicant: SAMSUNG ELECTRONICS CO., LTD., Suwon-si (KR)

(72) Inventors: Sushant Kondguli, San Jose, CA (US); Santosh Abraham, Pleasanton, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 104 days.

(21) Appl. No.: 16/988,526

(22) Filed: Aug. 7, 2020

(65) Prior Publication Data

US 2021/0374900 A1  Dec. 2, 2021

Related U.S. Application Data

(60) Provisional application No. 63/032,110, filed on May 29, 2020.

(51) Int. Cl.
| | | |
|---|---|---|
| *G06T 15/00* | (2011.01) | |
| *G06T 1/60* | (2006.01) | |
| *G06F 9/48* | (2006.01) | |
| *G06F 9/38* | (2018.01) | |
| *G06T 1/20* | (2006.01) | |

(52) U.S. Cl.
CPC ............. *G06T 1/60* (2013.01); *G06F 9/3877* (2013.01); *G06F 9/4843* (2013.01); *G06T 1/20* (2013.01)

(58) Field of Classification Search
CPC ........... G06T 1/00; G06T 1/0007; G06T 1/60; G06T 15/00; G06T 19/00; G06T 2201/00; G06F 9/544; G06F 11/3636; G06F 12/02; G06F 9/461
See application file for complete search history.

(56) References Cited

U.S. PATENT DOCUMENTS

| | | | |
|---|---|---|---|
| 2004/0160446 A1 | 8/2004 | Gosalia et al. | |
| 2011/0242118 A1* | 10/2011 | Bolz | ................. G06F 9/3891 |
| | | | 345/522 |
| 2012/0218278 A1* | 8/2012 | Marketsmueller | ..................... |
| | | | G06F 11/3636 |
| | | | 345/522 |
| 2013/0159449 A1 | 6/2013 | Taylor et al. | |
| 2013/0194286 A1 | 8/2013 | Bourd et al. | |
| 2014/0362081 A1 | 12/2014 | Cerny et al. | |
| 2015/0235341 A1 | 8/2015 | Mei et al. | |

(Continued)

*Primary Examiner* — Hau H Nguyen
(74) *Attorney, Agent, or Firm* — Lewis Roca Rothgerber Christie LLP

(57) ABSTRACT

A method includes determining that a new draw call is received; comparing a state identity (ID) of a graphics state stored in the ring storage with a state ID of a graphics state associated with the new draw call; determining if the ring storage has available space to store the graphics state associated with the new draw call; storing the graphics state associated with the new draw call in the ring storage, based on determining that the ring storage has available space; determining a location of a first valid and non-default entry and a last valid and non-default entry of the graphics state associated with the new draw call stored in the ring storage; and collecting data from one or more valid entries of the graphics state associated with the new draw call stored in the ring storage to complete a task associated with the new draw call.

20 Claims, 9 Drawing Sheets

(56) References Cited

U.S. PATENT DOCUMENTS

| | | |
|---|---|---|
| 2016/0259671 A1 | 9/2016 | Gosalia et al. |
| 2017/0256020 A1* | 9/2017 | Sansottera .............. G06T 15/10 |
| 2018/0122041 A1* | 5/2018 | Seo .......................... G06T 1/20 |
| 2019/0164328 A1 | 5/2019 | Achiarya et al. |

* cited by examiner

VARIABLE ENTRY TRANSITIONAL RING STORAGE FOR EFFICIENTLY ACCESSING GRAPHICS STATES

CROSS-REFERENCE TO RELATED APPLICATION(S)

The present application claims priority to and the benefit of U.S. Provisional Patent Application Ser. No. 63/032,110, filed May 29, 2020 and entitled "CIRCULAR BUFFER TO DECOUPLE STATE CACHE ACCESSES FROM COMPUTATION," the entire content of which is hereby expressly incorporated by reference.

FIELD

One or more aspects of the present disclosure relate to a ring storage, and more particularly to a variable entry transitional ring storage for efficiently accessing graphics states.

BACKGROUND

In modern GPUs, data stored in a state cache is often fetched and stored into an internal buffer before computations are performed with it. For example, case of vertex shaders, almost every new draw call needs to fetch states with information about vertex attributes (e.g., "states") from the state cache. The fetched state is stored in an internal buffer before it is used in computations. Thus, the state for a new incoming draw call may not be fetched unless there is enough space for it in the buffer. Accesses to this state cache may be relatively slow and could negatively impact the overall GPU performance. The problem is exacerbated in GPUs (e.g., mobile GPUs) employing some form of tile based deferred rendering (TBDR) architecture. In TBDR architectures, the draw calls are often repeated for primitives based on the screen space locations that they end of occupying. As a result, in such cases, the data accesses to the state variables of the draws (and primitives etc.) often increase multifold with little to no temporal locality. If the latencies of these state variable data accesses are exposed in the GPU pipeline (e.g., when all subsequent work is dependent on the data from these state variables), then it could significantly hurt the overall performance of the GPU.

The above information in the Background section is only for enhancement of understanding of the background of the technology and therefore it should not be construed as admission of existence or relevancy of the prior art.

SUMMARY

This summary is provided to introduce a selection of features and concepts of embodiments of the present disclosure that are further described below in the detailed description. This summary is not intended to identify key or essential features of the claimed subject matter, nor is it intended to be used in limiting the scope of the claimed subject matter. One or more of the described features may be combined with one or more other described features to provide a workable device.

Aspects of example embodiments of the present disclosure relate to a ring storage, and more particularly to a variable entry transitional ring storage for efficiently accessing graphics states.

In some embodiments, a method for storing and utilizing one or more graphics states in a ring storage by a graphics processing unit (GPU), the method includes determining, by the GPU, that a new draw call is received; comparing, by the GPU, a state identity (ID) of a graphics state stored in the ring storage with a state ID of a graphics state associated with the new draw call; determining, by the GPU, if the ring storage has available space to store the graphics state associated with the new draw call; storing, by the GPU, the graphics state associated with the new draw call in the ring storage, based on determining that the ring storage has available space; determining, by the GPU, a location of a first valid and non-default entry and a last valid and non-default entry of the graphics state associated with the new draw call stored in the ring storage; and collecting, by the GPU, data from one or more valid entries of the graphics state associated with the new draw call stored in the ring storage to complete a task associated with the new draw call.

In some embodiments, the method further includes reusing, by the GPU, the graphics state stored in the ring storage for the new draw call based on determining that the state ID of the graphics state stored in the ring storage matches the state ID of the graphics state associated with the new draw call. In some embodiments, the reused graphics state is used in a previous draw call, wherein a bandwidth of the GPU is magnified based on reusing the graphics state stored in the ring storage across two or more draw calls.

In some embodiments, storing, by the GPU, further includes monitoring, by the GPU, a draw ID stream of the GPU for new incoming draw calls; and storing, by the GPU, graphics states corresponding to the new incoming draw calls in the ring storage for future use by the GPU. In some embodiments, the graphics states corresponding to the new incoming draw calls are stored in the ring storage in an order with which the graphics states are requested by a GPU sub-block for corresponding new incoming draw calls, and wherein the graphics states corresponding to the new incoming draw calls are stored in the ring storage from a state cache of the GPU.

In some embodiments, the graphics states corresponding to the new incoming draw calls are stored in the ring storage at a first bandwidth, and the graphics states corresponding to the new incoming draw calls are stored in the state cache at a second bandwidth, wherein the first bandwidth is higher than the second bandwidth. In some embodiments, the graphics states stored in the ring storage are read-only for the GPU. In some embodiments, the method further includes storing, by the GPU, one or more graphics states corresponding to one or more new incoming draw calls in a state cache of the GPU, based on determining that the ring storage does not have available space; evicting, by the GPU, one or more graphics states from the state cache, the evicted one or more graphics states being different from the graphics states corresponding to the one or more new incoming draw calls; and evicting from the ring storage, by the GPU, one or more non-default entries of one or more graphics states as they are loaded into the ring storage to create space for more graphics states. In some embodiments, the one or more graphics states are evicted from the state cache based on determining that the one or more graphics states are stored in the ring storage.

In some embodiments, a method includes determining, by a graphics processing unit (GPU), that a ring storage of the GPU has available space to store one or more graphics states corresponding to one or more new incoming draw calls; storing, by the GPU, the one or more graphics states corresponding to the one or more new incoming draw calls in the ring storage of the GPU; determining, by the GPU, an active graphic state corresponding to an active draw call from among the one or more graphics states stored in the ring storage; determining, by the GPU, a location of a first valid entry and a last valid entry of the active graphics state associated with the active draw call; and collecting, by the GPU, data from one or more valid entries of the active graphics state stored in the ring storage to complete a task associated with the active draw call.

In some embodiments, the one or more graphics states corresponding to the one or more new incoming draw calls are stored in the ring storage of the GPU in an order with which the one or more graphics states are requested by a GPU sub-block of the GPU for corresponding new incoming draw calls. In some embodiments, the one or more graphics states corresponding to the one or more new incoming draw calls are stored in the ring storage from a state cache of the GPU. In some embodiments, the one or more graphics states corresponding to the one or more new incoming draw calls are stored in the ring storage at a first bandwidth, and the one or more graphics states corresponding to the one or more new incoming draw calls are stored in the state cache at a second bandwidth, wherein the first bandwidth is higher than the second bandwidth. In some embodiments, the one or more graphics states stored in the ring storage are read-only for the GPU.

In some embodiments, the method further includes reusing, by the GPU, a graphics state from among the one or more graphics states stored in the ring storage, for two or more draw calls, based on determining that a state identity (ID) of the graphics state matches a state ID of the graphics state associated with the two or more draw calls, wherein a bandwidth of the GPU is magnified based on reusing the graphics state stored in the ring storage across two or more draw calls. In some embodiments, the method further includes storing, by the GPU, the one or more graphics states corresponding to the one or more new incoming draw calls in a state cache of the GPU based on determining that the ring storage does not have available space to store the one or more graphics states corresponding to the one or more new incoming draw calls; evicting, by the GPU, a first plurality of graphics states from the state cache, the evicted first plurality of graphics states being different from the one or more graphics states corresponding to the one or more new incoming draw calls, based on determining that the first plurality of graphics states are stored in the ring storage; and evicting from the ring storage, by the GPU, one or more non-default entries of one or more graphics states as they are loaded into the ring storage to create space for more graphics states.

In some embodiments, a system including a graphics processing unit (GPU) in communication with a ring storage and a state cache, wherein the GPU is configured to compare a state identity (ID) of a graphics state stored in the ring storage with a state ID of a graphics state associated with a new draw call received by the GPU; store the graphics state associated with the new draw call in the ring storage, based on determining that the ring storage has available space, the graphics state stored in the ring storage being read-only for the GPU; determine a location of a first valid entry and a last valid entry of the graphics state associated with the new draw call stored in the ring storage; and collect data from one or more valid entries of the graphics state associated with the new draw call stored in the ring storage to complete a task associated with the new draw call.

In some embodiments, the GPU is further configured to reuse the graphics state stored in the ring storage for the new draw call based on determining that the state ID of the graphics state stored in the ring storage matches the state ID of the graphics state associated with the new draw call, wherein the reused graphics state is used in a previous draw call, wherein a bandwidth of the GPU is magnified based on reusing the graphics state stored in the ring storage across two or more draw calls.

In some embodiments, the GPU is further configured to monitor a draw ID stream of the GPU for new incoming draw calls; and store graphics states corresponding to the new incoming draw calls in the ring storage for future use by the GPU, wherein the graphics states corresponding to the new incoming draw calls are stored in the ring storage in an order with which the graphics states are requested by a GPU sub-block for corresponding new incoming draw calls, wherein the graphics states corresponding to the new incoming draw calls are stored in the ring storage from a state cache of the GPU, and wherein the graphics states corresponding to the new incoming draw calls are stored in the ring storage at a first bandwidth, and the graphics states corresponding to the new incoming draw calls are stored in the state cache at a second bandwidth, wherein the first bandwidth is higher than the second bandwidth.

In some embodiments, the GPU is further configured to store one or more graphics states corresponding to one or more new incoming draw calls in a state cache of the GPU, based on determining that the ring storage does not have available space; evict one or more graphics states from the state cache, the evicted one or more graphics states being different from the graphics states corresponding to the one or more new incoming draw calls, wherein the one or more graphics states are evicted from the state cache based on determining that the one or more graphics states are stored in the ring storage; and evict from the ring storage, one or more non-default entries of one or more graphics states as they are loaded into the ring storage to create space for more graphics states.

BRIEF DESCRIPTION OF THE DRAWINGS

These and other features of some example embodiments of the present disclosure will be appreciated and understood with reference to the specification, claims, and appended drawings, wherein:

DETAILED DESCRIPTION

Figure 1:
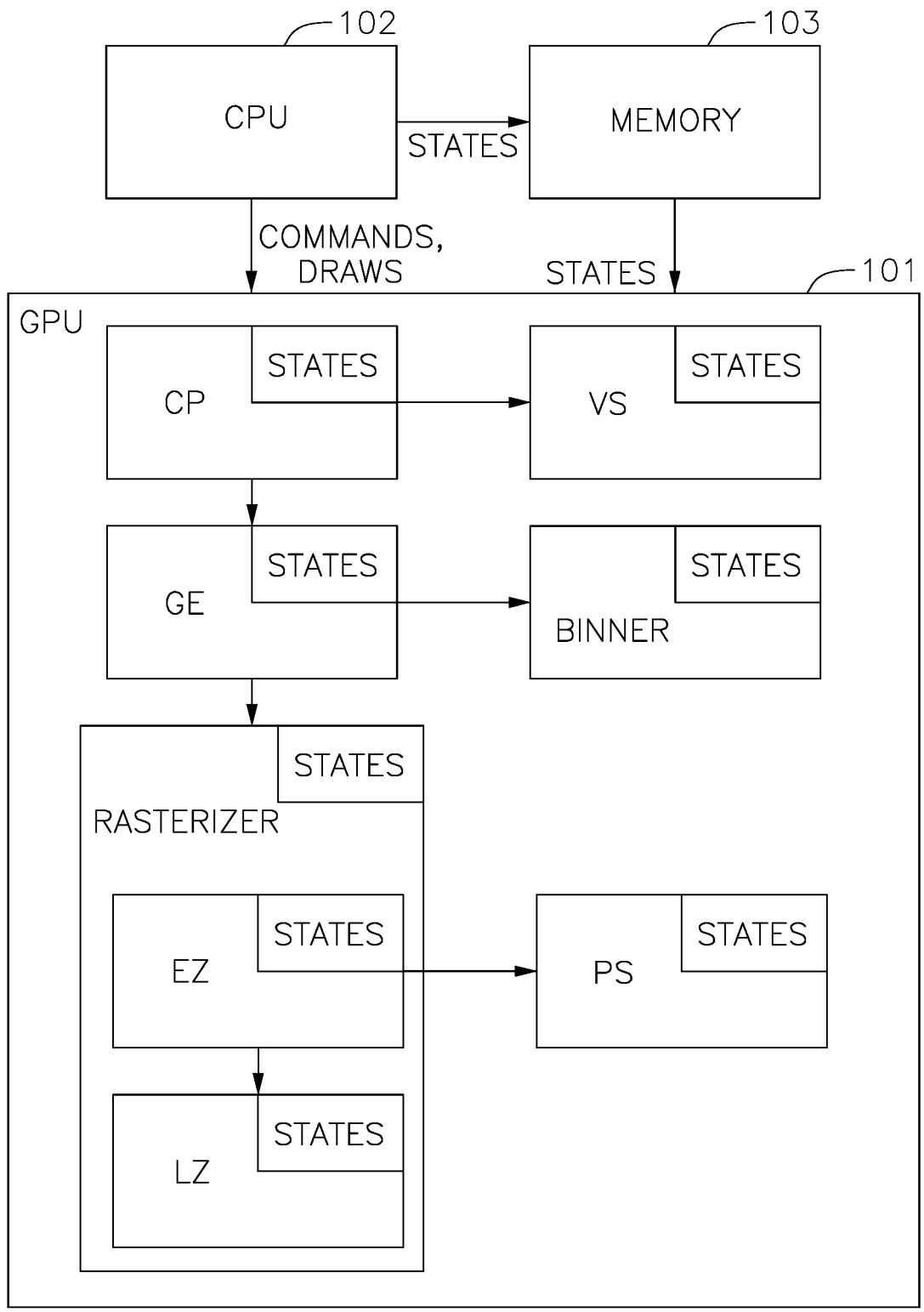
FIG. 1 illustrates a block diagram of various pipeline stages or sub-units of a graphics processing unit (GPU) connected to a memory and a central processing unit (CPU), according to some embodiments of the present disclosure.

The detailed description set forth below in connection with the appended drawings is intended as a description of some example embodiments of method and apparatus for a variable entry transitional ring storage for efficiently accessing graphics states provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the scope of the present disclosure.

Spatially relative terms, such as "beneath", "below", "lower", "under", "above", "upper" and the like, may be used herein for ease of description to describe one element or feature's relationship to another element(s) or feature(s) as illustrated in the figures. It will be understood that such spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the present disclosure. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the present disclosure refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

In some embodiments, one or more outputs of the different embodiments of the methods and systems of the present disclosure may be transmitted to an electronics device coupled to or having a display device for displaying the one or more outputs or information regarding the one or more outputs of the different embodiments of the methods and systems of the present disclosure.

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present disclosure.

FIG. 1 illustrates a block diagram of various pipeline stages or sub-units of a graphics processing unit (GPU) connected to a memory and a central processing unit (CPU), according to some embodiments of the present disclosure. For example, in FIG. 1, a GPU 101 is connected to a CPU 102 and a memory 103. As shown in FIG. 1, in some embodiments, the GPU 101 includes various pipeline stages or sub-units, e.g., a command processor (CP) sub-block or unit, a geometry engine (GE) sub-block or unit, a vertex shaders (VS) sub-block or unit, a Binner sub-block or unit, a Rasterizer sub-block or unit including an early Z test (EZ)

sub-block or unit and a late Z test (LZ) sub-block or unit, and a pixel shaders (PS) sub-block or unit.

Modern graphics processors (e.g., the GPU 101) process work by distributing it across various pipeline stages or sub-units (e.g., CP, GE, VS, Binner, Rasterizer including the EZ and the LZ, and PS, etc.). At any given time, different units in the pipeline often require access to different states. In some embodiments, these graphics states are read-only for the GPU (e.g., the GPU 101). For example, the graphics states may be pre-generated by the CPU (e.g., the CPU 102) and may be stored into the memory (e.g., the memory 103) before the GPU (e.g., the GPU 101) starts processing the frame. In some embodiments, managing graphics states across all the pipeline stages may be cumbersome and inefficiency may cost performance. One or more embodiments of the present disclosure may identify a state management inefficiency that may occur in the GPU (e.g., the GPU 101) architectures (e.g., in a GPU with tile-based deferred rendering (TBDR)) and may provide an optimization to overcome such inefficiency in the state management in the GPU (e.g., the GPU 101).

Further, in modern GPUs, data stored in a state cache is often fetched and stored into an internal buffer before computations are performed with it. For example, in case of vertex shaders, almost every new draw call needs to fetch states with information about vertex attributes (e.g., "states") from a state cache. Accesses to this state cache may be relatively slow. The fetched state is stored in an internal buffer before it is used in computations. Thus, the state for a new incoming draw call may not be fetched unless there is enough space for it in the buffer. One or more embodiments of the present disclosure provide a circular buffer architecture for allowing simultaneous fetching of vertex descriptor states across multiple draw calls and their efficient storage in the internal buffer. One or more embodiments of the present disclosure are not limited to vertex shaders and may be extended to any of the GPU sub-blocks.

Figure 2A:
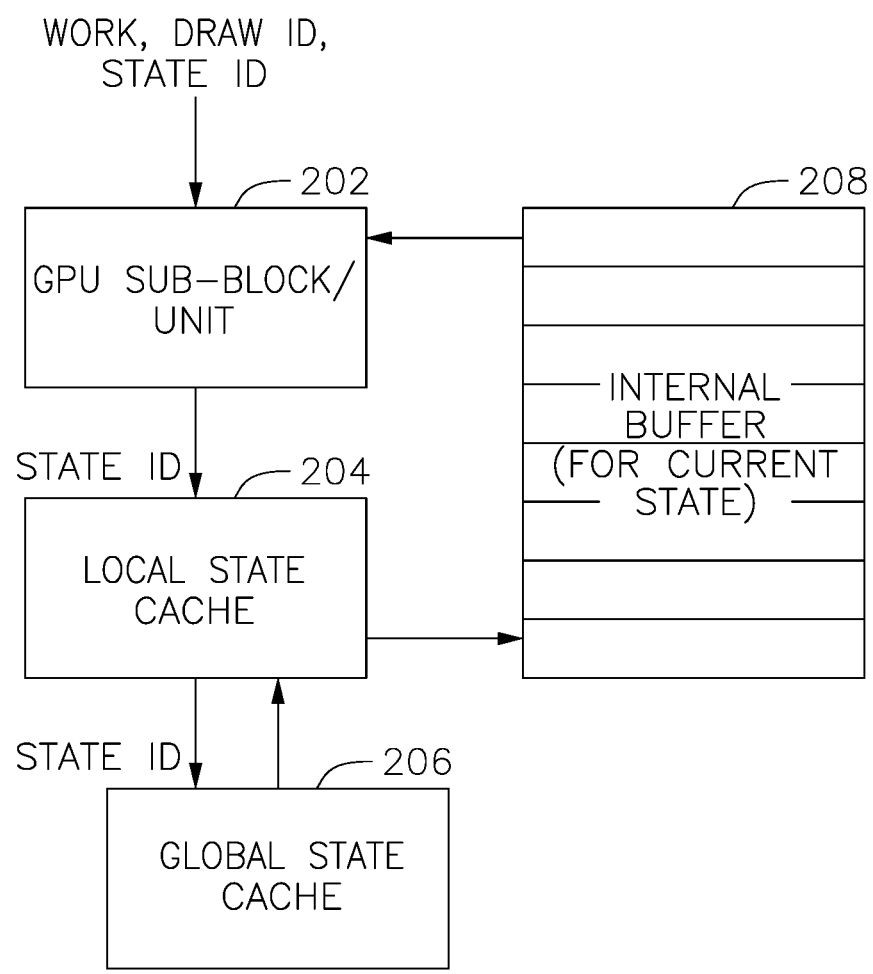
FIGS. 2A-2B, illustrate a GPU architecture, according to some embodiments of the present disclosure.
Figure 2B:
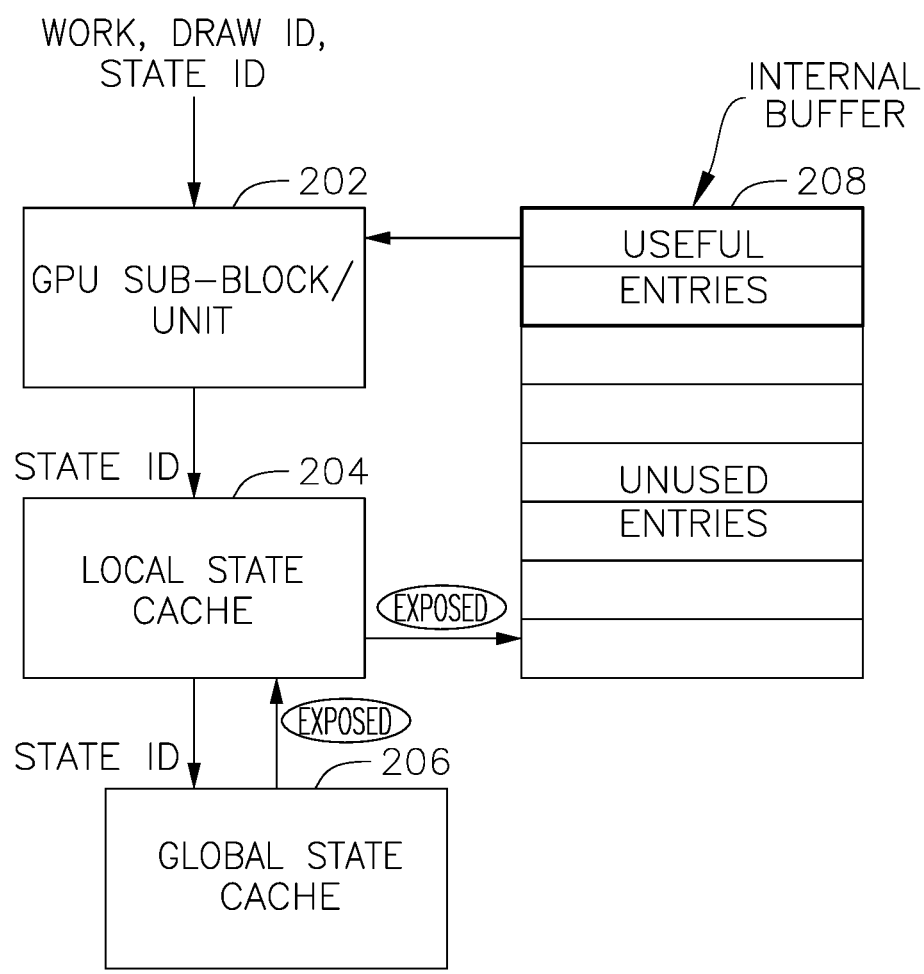

For example, FIGS. 2A-2B, illustrate a GPU architecture, according to some embodiments of the present disclosure. As shown in FIG. 2A, a GPU sub-block 202 loads the states it needs from a local or global state cache. For example, the GPU sub-block 202 may load the desired states from a local state cache 204 or a global state cache 206. In one or more embodiments, for example, state data requested by the GPU sub-block 202 are loaded into the local state cache 204 and indexed with a state id. In some embodiments, all future requests to the state are serviced by the local state cache 204. In some embodiments, the state being currently used by the GPU sub-block 202 may be loaded into an internal buffer 208 for a relatively faster access. In some embodiments, for a new unit of work (e.g., a new draw call), one or more states in the internal buffer 208 may be invalidated and a new state may be loaded from the local state cache 204 or the global state cache 206.

In one or more embodiments, the portion of a state needed by the GPU sub-block 202 for a new draw call may be a subset of the entire state and therefore, depending on the particular state and the sub-block (e.g., depending on the properties of the GPU sub-block 202), many entries in the internal buffer 208 may be left unused. In one or more embodiments, as shown in FIG. 2B, every new unit of work may incur an access to the state cache (e.g., the local state cache 204 or the global state cache 206) and may expose the state cache access latency. In one or more embodiments, every local state cache miss may incur a global state cache access. For example, every cache miss for the local state cache 204 may incur a cache access to the global state cache 206. In some embodiments, the latency of every global state cache (e.g., the global state cache 206) may be exposed to the pipeline (e.g., the GPU pipeline) as they are only made on-demand, which in some cases may pose a security risk for the GPU and may significantly hurt its performance efficiency.

One or more embodiments of the present disclosure provide an architecture for accessing and storing the 'read-only' state data across the multiple pipeline stages of a GPU (e.g., the multiple pipeline states of the GPU 101) in a space and time sensitive manner. For example, one or more embodiments of the present disclosure may provide solutions to overcome one or more challenges in a GPU design, for example, exposed state cache access latency, inefficient use of local or sub-block specific storage space for state data, etc.

For example, GPUs tend to use internal state caches to store states associated with a draw call. These caches may have a long average access time. However, the access may only be performed when there is enough space in the internal buffers to store the fetched data. One or more embodiments of the present disclosure may improve the performance of vertex shaders by hiding the long latency state cache accesses while improving the space utilization of the internal buffer used to store the states fetched from state cache.

Further, one or more embodiments of the present disclosure may provide a circular buffer architecture that may be used to store states belonging to multiple draw calls. The design makes better use of the buffer storage space by making use of the unused buffer entries to store the states of an incoming draw call. This allows for the fetching of states of a future draw call while a warp from an earlier draw call is being processed.

For example, some embodiments of the present disclosure may provide a GPU architecture that can minimize or reduce the impact of state cache access latency on the overall performance. For example, one or more embodiments of the present disclosure may enable the GPU to hide the state cache access latency by overlapping the state cache access of a future draw call with the computation phase of a warp from an earlier draw call. Further, some embodiments of the present disclosure may reduce the execution cycles required for the binning pass (introduced by a TBDR like architecture) of a representative graphics benchmark.

For example, some embodiments of the present disclosure may redesign the architecture of the internal buffer used to store graphics states in the vertex attribute fetch pipe by 1) only storing the states of active attributes in a draw call that are needed by the shader to improve utilization and create buffer space for subsequent draw calls, 2) maintaining pointers to indicate the location of the first active attribute corresponding to each draw call, 3) maintaining a head pointer to indicate the location of the first active attribute corresponding to the active draw call, 4) maintaining valid bits to indicate the locations that have active attributes, and 5) fetching a state for a future draw call when there is empty space in the buffer.

For example, one or more embodiments of the present disclosure may organize the internal buffer of sub-blocks as a ring storage, where the ring storage may store multiple states simultaneously. In one or more embodiments, only non-default state information is kept in the ring storage, which depending on the sub-block may be a smaller subset of the entire state. In one or more embodiments, the states are reused across waves or draws. Further, in some embodiments, incoming draw identity (ID) stream may be used to preload future states and hide state cache or memory access latency.

FIGS. 3A-3E illustrate a GPU architecture, according to some embodiments of the present disclosure.

Figure 3A:
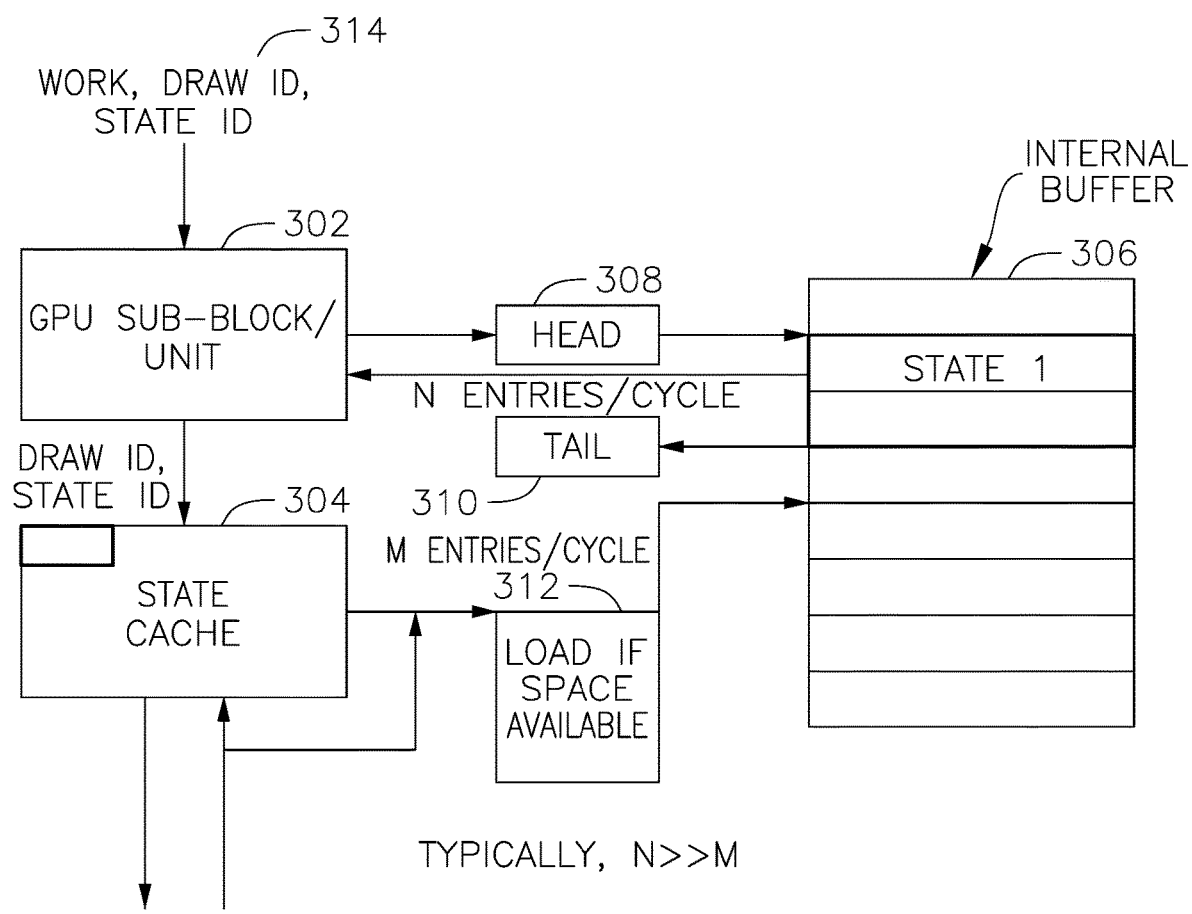
FIGS. 3A-3E illustrate a GPU architecture, according to some embodiments of the present disclosure.

Some embodiments of the present disclosure may be structured to exploit reuse of state data across different units of work. For example, as shown in FIG. 3A, in one or more embodiments, state accesses from the GPU sub-block or unit 302 may be limited to the internal-buffer 306 (e.g., a ring storage) and an access to state-cache 304 (e.g., a local state cache or a global state cache) may only occur at a draw call boundary (e.g., when the GPU sub-block begins work corresponding to a new draw call). In one or more embodiments, the states are read-only graphics states.

In some embodiments, the state of a draw call may include all the information instructing a GPU about textures, states, shaders, rendering objects, buffers, etc. encapsulated by the CPU that prepares drawing resources for the graphics card. For example, a draw call may be a call to the graphics API to draw objects while a batch is a group of draw calls to be drawn together. Batching objects to be drawn together, may reduce the state changes required to draw each object inside the batch. For example, to draw an object on the screen, the CPU may issue a draw call to the graphics API (e.g., OpenGL or Direct3D). Draw calls are often resource-intensive, with the graphics API doing significant work for every draw call, causing performance overhead on the CPU side. This is often caused by the state changes done between the draw calls (e.g., switching to a different material), which causes resource-intensive validation and translation steps in the graphics driver.

As shown in FIG. 3A, at the beginning of a new draw, head pointer 308 may be incremented with the size of the last draw's non-default state and the GPU sub-block 302 may start fetching data from the new state (e.g., state 1 in FIG. 3A) if present (head!=tail) or wait for it to be loaded from the state cache 304.

For example, at the beginning of a new draw, first, the head pointer 308 may be incremented with the size of the last draw's state variables with non-default values. Most graphics state variable have their own default values. In this context, non-default states are referring to state variables whose values for the current draw are different than their default values. Next, the GPU may determine if the head pointer 308 is equal to the tail pointer 310. If it is determined that the head pointer 308 is not equal to the tail pointer 310 (which may indicate that a new state is already present at the internal buffer 306 (e.g., a ring buffer)), the GPU sub-block 302 may start fetching data from the new state (e.g., state 1). However, if it is determined that the head pointer 308 is equal to the tail pointer 310 (which may indicate that a new state is not present at the internal buffer 306 (e.g., a ring buffer)), the GPU sub-block 302 may wait for a new state to be loaded to the internal buffer 306 from the state cache 304, as every time a new draw is received, a new state may be loaded into the internal buffer 306 (e.g., a ring buffer). In some embodiments, the rate of data entries per cycle from the internal buffer 306 to the GPU sub-block 302 may be much higher than the rate of data entry from the state cache 304 to the internal buffer 306, and therefore, bandwidth magnification may be achieved.

A new state is loaded into the internal buffer 306 (e.g., the ring storage) every time a new draw is received. However, in some embodiments, as shown in FIG. 3B, in cases where consecutive draws use the same states, entries in the internal buffer 306 (e.g., a ring buffer or a ring storage) may also be appended with state IDs, which may allow for further reuse of states (or state data) that are already stored in the internal buffer 306 across consecutive draws (e.g., a ring buffer)).

For example, in a case where consecutive draws use the same states, at draw call boundaries (e.g., when a new draw is received), the state ID of the state entry (e.g., the state ID of the state (e.g., state 1) that are already stored in the internal buffer 306) may be compared with the state ID of (or associated with) the new draw, and if they match, the head pointer 308 is not updated and the state (e.g., state 1 that is already stored in the internal buffer 308 (e.g., ring buffer)) is reused. This further extends the bandwidth magnification property across draws. Further, in cases where consecutive draws use the same states, the GPU may also keep track of the last state loaded and may not reload the same state (e.g., based on determining that the state ID of the last state loaded is the same as the state ID associated with the new draw) in a consecutive location in the internal buffer 306 (e.g., the ring storage).

Figure 3B:
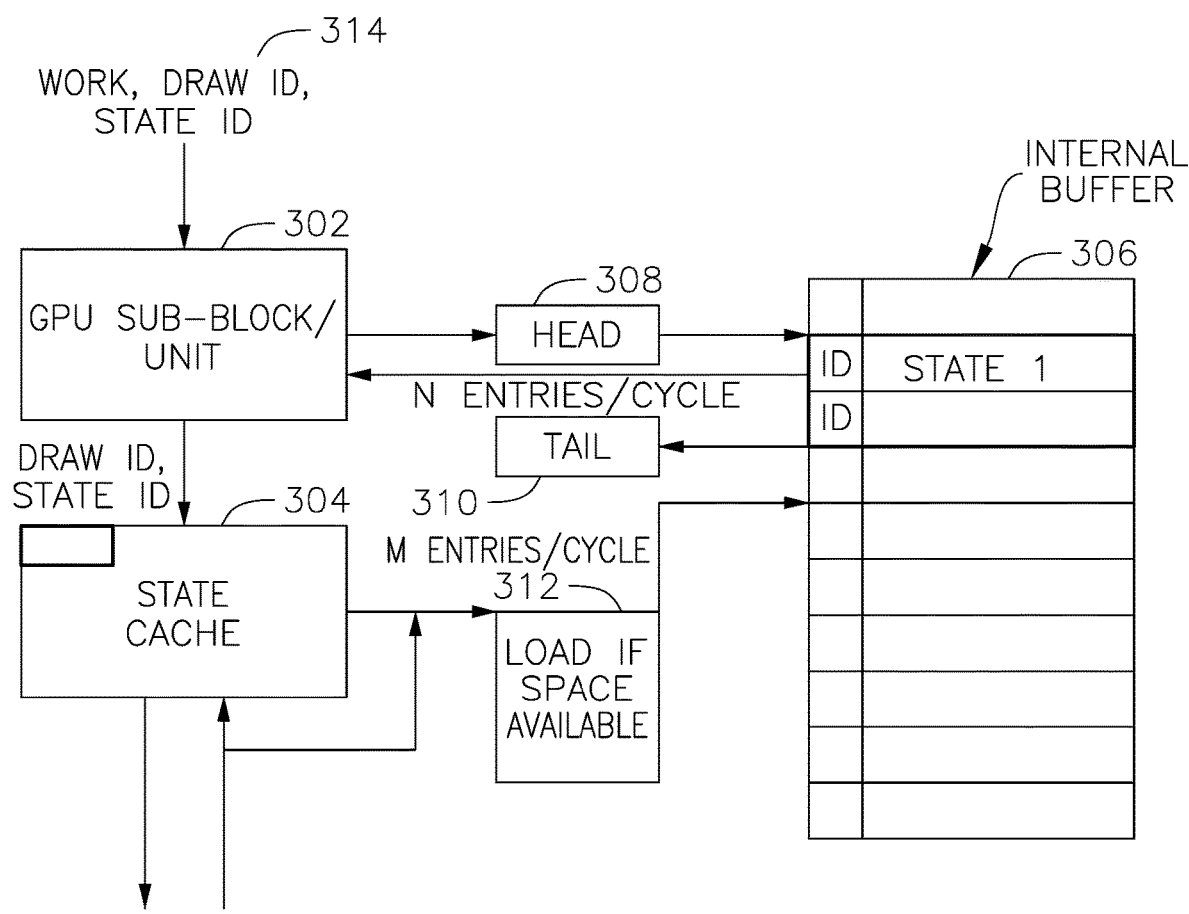

For example, as shown in FIG. 3B, when a new draw is received, the GPU may compare the state ID of the state entry (e.g., the state ID of the state (e.g., state 1) that are already stored in the internal buffer 306) with the state ID of (or associated with) the new draw. If the state ID of the state entry (e.g., the state ID of the state (e.g., state 1) in the internal buffer 306) matches with the state ID of (or associated with) the new draw, the head pointer 308 is not updated and the state that was used in the previous draw (e.g., state 1)) is reused, which may magnify the bandwidth across draws.

Figure 3C:
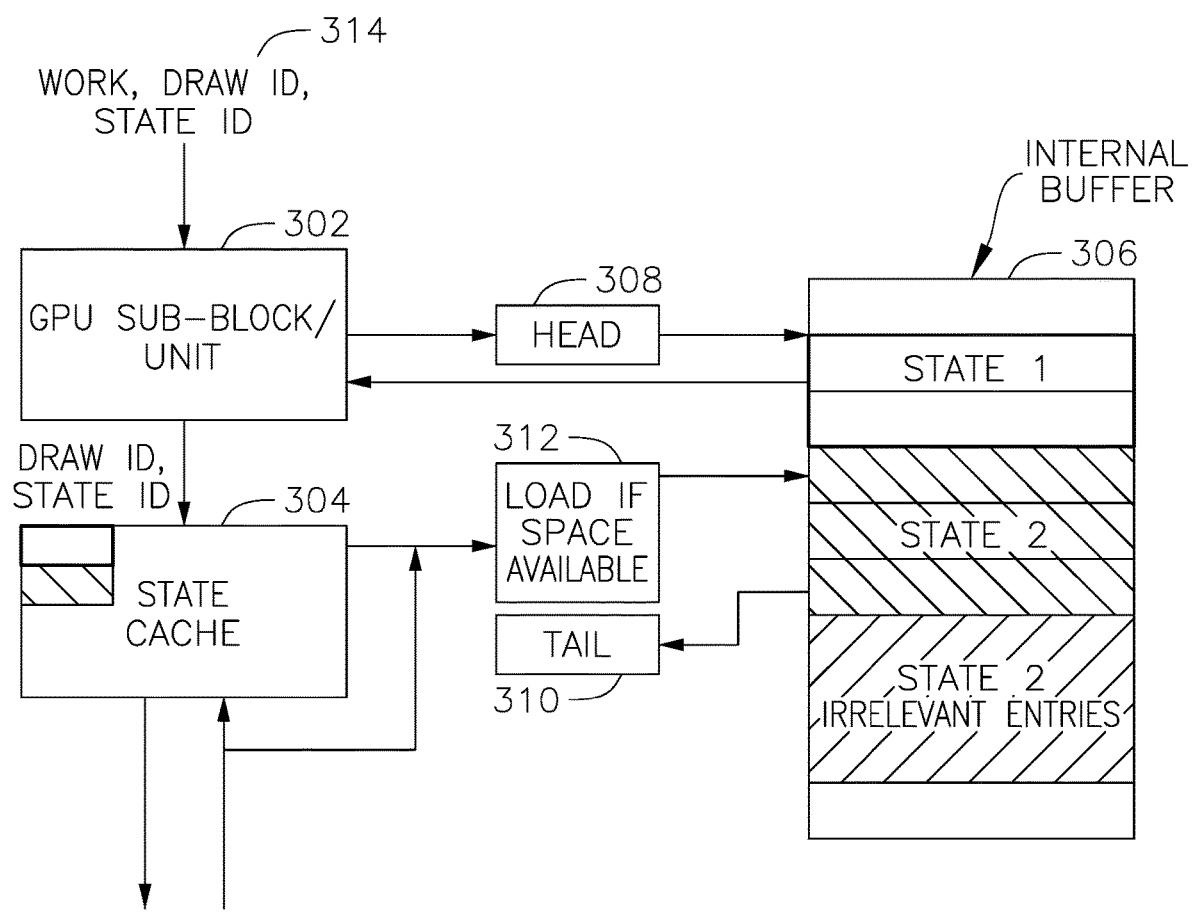

As discussed above, a new state may be loaded into the ring storage every time a new draw is received. For example, as shown in FIG. 3C, when a new draw is received, a state corresponding to the new draw may be loaded in the internal buffer 306 (e.g., a ring storage) from the state cache 304. In one or more embodiments, the states corresponding to future draws may be pre-stored in the state cache 304 based on the draw ID of a particular draw and the state ID of the state corresponding to the particular draw. For example, the GPU may pre-store states corresponding to future draws in the state cache 304 to be loaded to the internal buffer 306 (e.g., a ring storage) when a particular draw is called, for convenience of operation and reduced state access latency and/or performance improvement. The states (e.g., graphics states) that are stored in the internal buffer 306 (e.g., a ring storage) or in the in the state cache 304 may have different sizes or variable sizes.

When a new draw is received, the state corresponding to the new draw is loaded from the state cache 304 into the internal buffer 306 (e.g., a ring storage), if enough space to store that state is available in the internal buffer 306 (e.g., a ring storage). In one or more embodiments, the last valid entry (or last non-default entry or both) (which may vary depending on the GPU sub-block 302) in the loaded state (e.g., the newly loaded state (e.g., State 2)) is identified and the tail pointer 310 is updated to point to a location directly following this entry (e.g., the last valid or last non-default entry or both). Therefore, the entries occupied by the state in the internal buffer 306 (e.g., a ring storage) are less than the maximum allowed entries per state. In this case, the GPU sub-block 302 will use State 1 which is being used by the active draw. State 2 is being loaded from the state cache 304 for a future draw that the GPU sub-block 302 will work on. In one or more embodiments, once the tail pointer 310 is updated to point to a location directly following the last valid entry (or last non-default entry or both) of the newly loaded state (e.g., State 2), the head pointer 308 may be incremented (after the GPU sub-block has finished working on the current active draw) with the size of the state most recently used (e.g., State 1) and the GPU sub-block 302 may start fetching from the new state (e.g., State 2). In some embodiments, the non-default or non-valid or irrelevant entries of the state may be discarded by the GPU sub-block 302 as they are loaded into the internal buffer 306, to create space for more states.

Figure 3D:
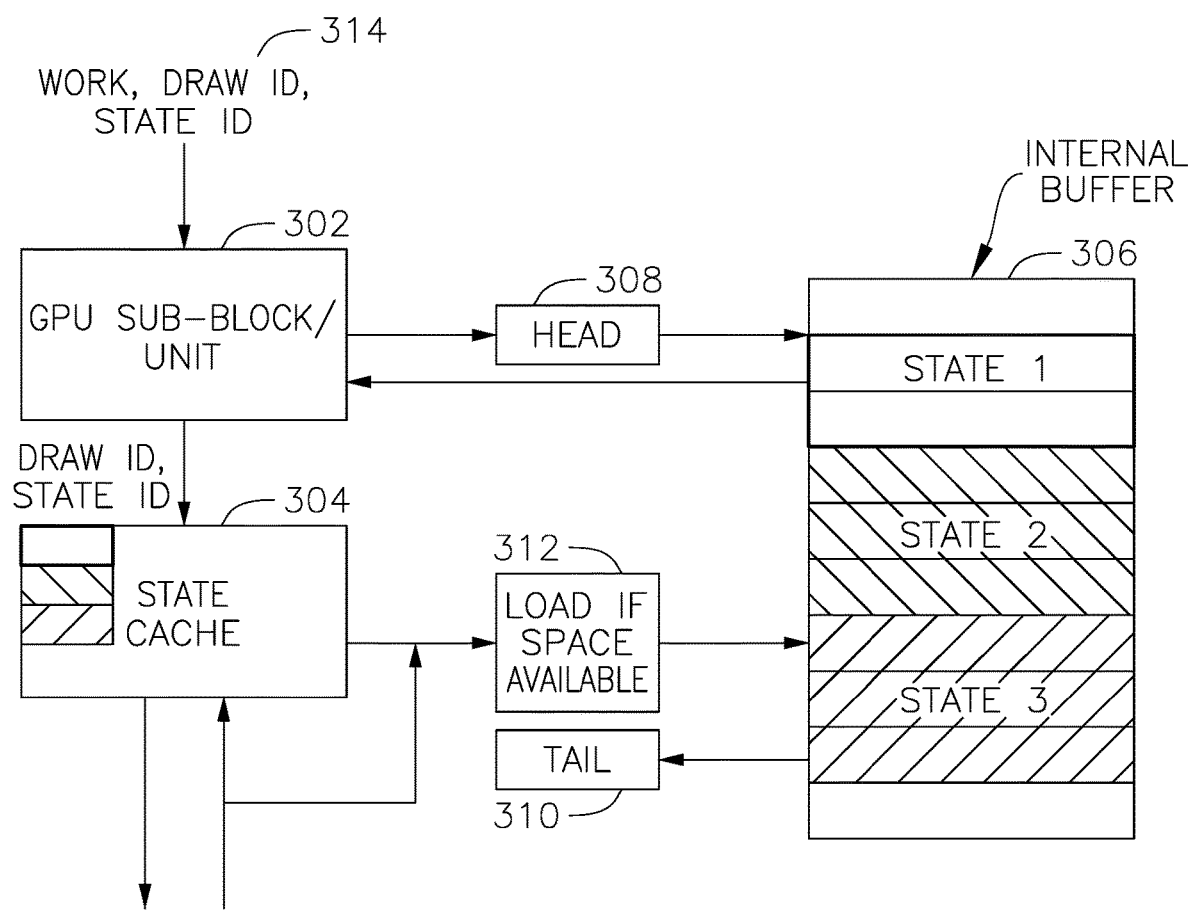

One or more embodiments of the present disclosure may also reduce access latency of new states. For example, as shown in FIG. 3D, in one or more embodiments, the GPU may monitor the draw ID stream 314 for new incoming draws. In such a case, the states corresponding to the new incoming draws may be loaded into the internal buffer 306 (e.g., the ring storage) even before the GPU sub-block 302 starts doing work (e.g., computations) that requires these states. In one or more embodiments, once the draw ID of the new incoming draws are identified by the GPU (e.g., based on monitoring the draw ID stream 314), states corresponding to the new incoming draws may be identified based on the corresponding state ID. In some embodiments, the states corresponding to the new incoming draws may be loaded into the internal buffer 306 (e.g., a ring storage) from the state cache 304 before the GPU sub-block 302 starts doing work (e.g., computations) that requires the newly loaded states. In some embodiments, the new states may be loaded into the internal buffer 306 from the state cache 304 in the order with which they are requested by a GPU sub-block 302.

Therefore, one or more embodiments of the present disclosure may provide a preloading mechanism for state data, and in some embodiments, the preloaded states in the internal buffer 306 (e.g., a ring storage) may be consumed by the GPU sub-block 302 at a higher bandwidth than the one with which they were loaded into the internal buffer 306 (e.g., a ring storage) from the state cache 304 (e.g., when a new draw is received, as discussed with respect to FIG. 3C).

Figure 3E:
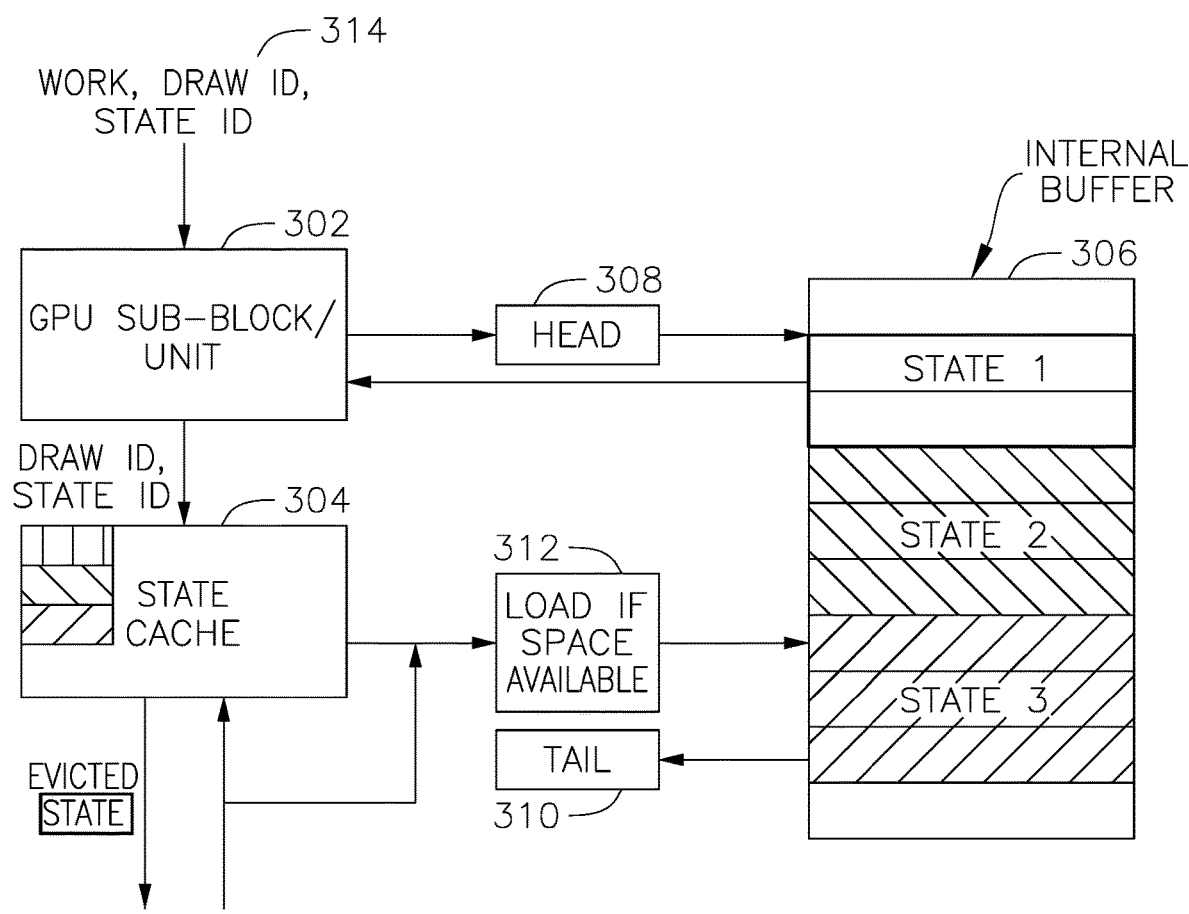

As shown in FIG. 3E, in one or more embodiments, the GPU may be configured to preload states even when the space in the internal buffer 306 (e.g., a ring storage) is not sufficient to hold the state. In such a case, the new state is loaded only into the state cache 304. While preloading the states into the state cache 304, the GPU may be configured to instruct the state cache 304 to evict the states currently used by the GPU sub-block 302 or the states that are already loaded into the internal buffer 306. The trade-off here is the loss of reusability of the evicted states. In such a case, the internal buffer 306 (e.g., a ring storage) may effectively increase state cache's 304 capacity by also acting as an additional storage space.

For example, as shown in FIG. 3E, when the space in the internal buffer 306 (e.g., a ring storage) is not sufficient to hold the new states corresponding to the new incoming draws, the GPU may preload the new states into the state cache 304 and may evict the states from the state cache 304 that are already stored in the internal buffer 306 (or a ring storage) to be used by the GPU sub-block 302. In some embodiments, the GPU may evict the oldest state from the internal buffer 306 (e.g., a ring storage) if there is no space available in the internal buffer 306 (e.g., a ring storage) to store a state (e.g., a new state) corresponding to a new draw requested by the GPU sub-unit 302, and in some embodiments, the internal buffer 306 (e.g., a ring storage) may store the states (e.g., graphics states) at a rate supported by the state cache 304.

Therefore, one or more embodiments of the present disclosure may provide efficient usage of the internal buffer 306 (e.g., a ring storage) in many of the sub-blocks (e.g., vertex attribute fetch pipe) of the GPU. Efficient usage may provide more storage space in the internal buffer 306 (e.g., a ring storage) for storing states of multiple draw calls. As a result, one or more embodiments of the present disclosure may help to mitigate the effect of long latency state cache accesses on the overall GPU architecture.

For example, one or more embodiments of the present disclosure may fetch state required for a future draw call while warps from the previous draw calls are being processed, may provide a buffer storage that only stores state that is needed for computation and can store states for multiple draw calls simultaneously. As such, one or more embodiments of the present disclosure may mitigate the effect of state cache access latency on overall performance of the GPU, may improve performance of the shader programs that have draw calls with fewer warps, may improve performance in case of frequent state changes that could be caused as a result of the GPU architecture (e.g., TBDR) or program behavior, and may also improve utilization of the buffer storage space.

Figure 4:
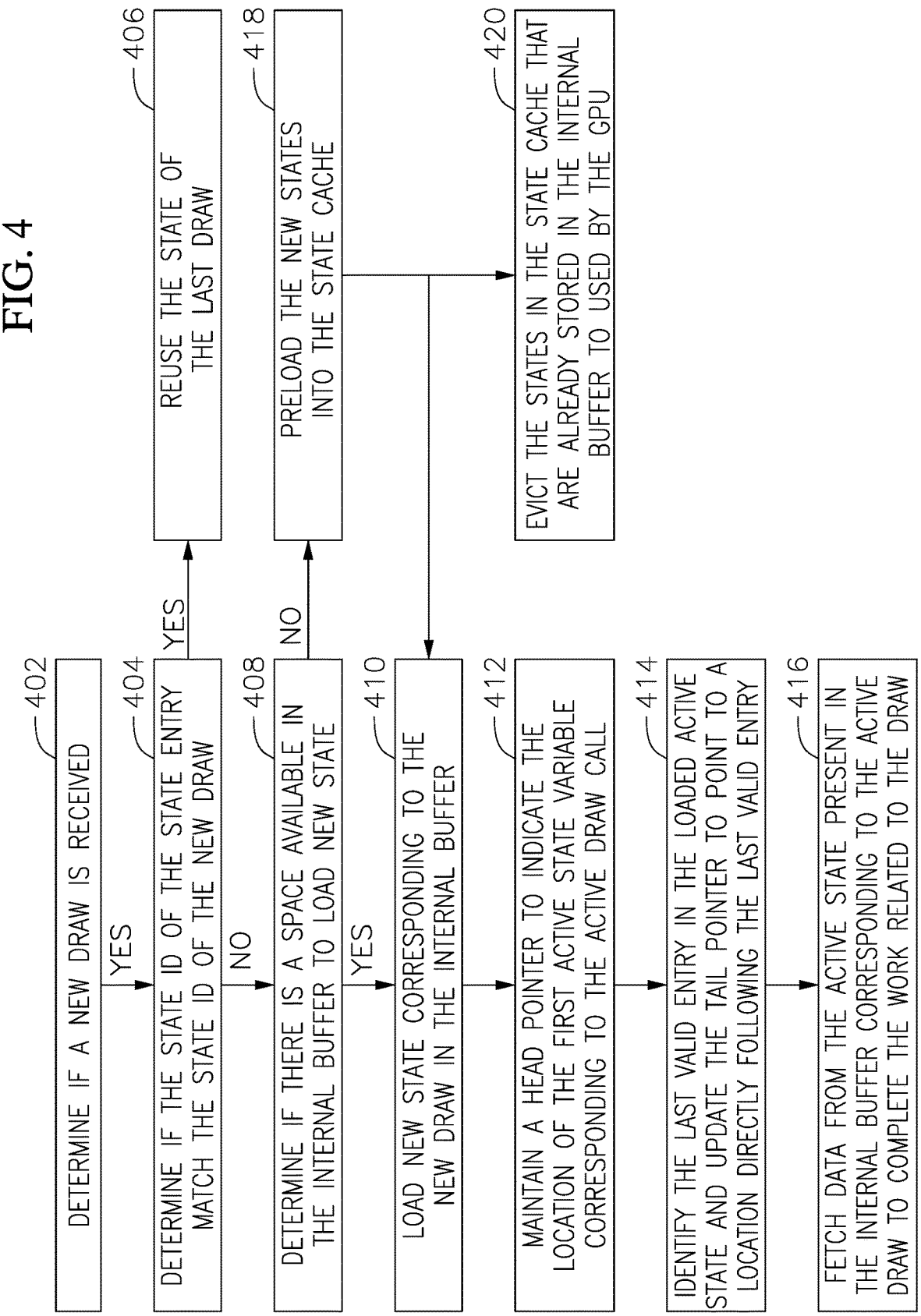
FIG. 4 illustrates a method for storing and utilizing the graphics states corresponding to multiple draw calls in an internal buffer (e.g., a ring buffer) in a GPU, according to some embodiments of the present disclosure.

FIG. 4 illustrates a method for storing and utilizing the graphics states corresponding to multiple draw calls in an internal buffer (e.g., a ring buffer) in a GPU, according to some embodiments of the present disclosure.

At 402, the GPU sub-block unit determines if a new draw call is received (e.g., from the CPU).

If at 402, it is determined that a new draw call is received at the GPU sub-block unit, at 404, the GPU may compare the state ID of the state entry (e.g., the state ID of the state (e.g., state 1) that was used in the previous draw and is already stored in the internal buffer 306, as shown in FIG. 3B) with the state ID of (or associated with) the new draw.

At 404, if the state ID of the state entry (e.g., the state ID of the state (e.g., state 1) in the internal buffer 306) matches with the state ID of (or associated with) the new draw, the head pointer (e.g., the head pointer 308) is not updated, and at 406, the state that was used in the previous draw (e.g., state 1)) is reused, which may magnify the state access bandwidth across draws.

However, at 404, if the state ID of the state entry (e.g., the state ID of the state (e.g., state 1) in the internal buffer 306) does not match the state id of (or associated with) the new draw, at 408, the GPU determines if there is a space available in the internal buffer (e.g., the internal buffer 306 (or the ring buffer)) to load the new state corresponding to the new draw.

If so, at 410, the GPU loads the new state corresponding to the new draw in the internal buffer (e.g., the internal buffer 306 (or the ring buffer)).

In some cases, at 410, the GPU may monitor the draw ID stream (e.g., draw stream ID 314) for new incoming draws. In such a case, the states corresponding to the new incoming draws may be loaded into the internal buffer (e.g., the internal buffer 306 (or the ring buffer)) even before the GPU sub-block (e.g., GPU sub-block 302) starts doing work that requires these states. In one or more embodiments, once the draw ID of the new incoming draws are identified by the GPU sub-block (e.g., based on monitoring the draw ID stream 314), states corresponding to the new incoming draws may be identified based on the corresponding state ID. In some embodiments, the states (e.g., the read-only graphics states) corresponding to the new incoming draws may be loaded into the internal buffer (e.g., the internal buffer 306 (or the ring buffer)) from the state cache (e.g., the state cache 304) before the GPU sub-block (e.g., GPU sub-block 302) starts doing work that requires the newly loaded states. In some embodiments, the new states may be loaded into the internal buffer (e.g., the internal buffer 306 (or the ring buffer)) from the state cache (e.g., the state cache 304) in the order with which they are requested by a GPU sub-block (e.g., GPU sub-block 302). Therefore, one or more embodiments of the present disclosure may provide a preloading mechanism for state data, and in some embodiments, the preloaded states in the internal buffer (e.g., the internal buffer 306 (or the ring buffer)) may be consumed by the GPU sub-block (e.g., the GPU sub-block 302) at a higher bandwidth than the one with which they were loaded into the internal buffer (e.g., the internal buffer 306 (or the ring buffer)) from the state cache (e.g., the state cache 304, for example, when a new draw is received, as discussed with respect to FIG. 3C).

In some embodiments, where the states corresponding to the new incoming draws are preloaded states in the internal buffer (e.g., the internal buffer 306 (or the ring buffer)), the GPU may determine an active state corresponding to an active draw call.

At 412, the GPU may instruct the head pointer to indicate the location of the first active state variable corresponding to the active draw call. For example, the head pointer (e.g., the head pointer 308 of FIGS. 3A-3E) may point to a location of a first valid entry of the active state in the internal buffer (e.g., the internal buffer 306 (or the ring buffer)) corresponding to the active draw.

At 414, the GPU may identify the last valid entry in the loaded active state (or the active state corresponding to the active draw) and update the tail pointer to point to a location directly following the last valid entry of the active state.

At 416, the GPU (e.g., the GPU sub-block 302) fetches data from the active state present in the internal buffer (e.g., internal buffer 306) corresponding to the active draw to complete the work (e.g., computation) related to the draw. For example, at 416, the GPU sub-block 302 may collect data from the one or more valid entries of the graphics state associated with the new draw call (or the active state corresponding to the active draw) stored in the internal buffer 306 (or the ring buffer) to complete a task associated with the new draw call.

Referring back to 408, at 408, if the GPU determines that the space in internal buffer (e.g., the internal buffer 306 (e.g., the ring storage)) is not sufficient to hold new states corresponding to the new incoming draws, at 418, the GPU preloads the new states into the state cache (e.g., state cache 304). From 418, the process may go to 410.

At 420, the GPU evicts the states in the state cache (e.g., the state cache 304) that are already stored in the internal buffer (e.g., the internal buffer 306 (e.g., the ring storage)) to be used by the GPU (e.g., the GPU sub-block 302). In some embodiments, the GPU may evict the oldest state from the internal buffer (e.g., the internal buffer 306 (e.g., the ring storage)) if there is no space available in the internal buffer to store a state (e.g., a new state) corresponding to a new draw requested by the GPU sub-unit (e.g., GPU sub-unit 302), and in some embodiments, the internal buffer (e.g., the internal buffer 306 (e.g., the ring storage)) may store the states (e.g., graphics states) at a rate supported by the state cache (e.g., state cache 304). In some embodiments, the non-default or non-valid or irrelevant entries of the state may be discarded by the GPU sub-block 302 as they are loaded into the internal buffer 306, to create space for more states.

Therefore, some embodiments of the present disclosure may improve the access latency and bandwidth of 'read-only' state (e.g., the read-only graphic state) data. Also, some embodiments of the present disclosure may store the states (e.g., the read-only graphic state) of varying sizes in the internal buffer (or the ring buffer) of the GPU depending on the size of the state data where the space allocated to the state in the internal buffer (or the ring buffer) is equal to the size of the state. Further, some embodiments of the present disclosure, may reuse of the same state repeatedly across multiple waves and/or multiple draws. Some embodiments of the present disclosure may function as a bandwidth magnifier. For example, if the state cache can deliver only one word per cycle for instance, the ring storage may be designed to deliver four words, magnifying effective bandwidth by a factor of four in the reuse cases.

Some embodiments of the present disclosure may reduce latency. Without it and no reuse from the state cache, each new draw call incurs the long latency required to access a global state cache. In some embodiments, there is sufficient space to accommodate multiple draw calls of the states, and therefore, while State 1 and State 2 is being consumed, State 3 can be fetched without stalling the downstream units.

Some embodiments of the present disclosure may identify the order in which the data will be consumed by the GPU sub-unit and may exploit this property to preload this data (e.g., the new states corresponding to the new incoming draws) in advance. In some embodiments, the GPU may evict entries that are currently being stored in the internal buffer (or the ring storage) or used by the GPU sub-block, from the state cache and may use the newly available space in the state cache for loading future states (e.g., the new states corresponding to the new incoming draws), and therefore increasing the state cache capacity.

Although example embodiments of a variable entry transitional ring storage for efficiently accessing graphics states have been specifically described and illustrated herein, many modifications and variations will be apparent to those skilled in the art. Accordingly, it is to be understood that a variable entry transitional ring storage for efficiently accessing graphics states according to principles of this disclosure may be embodied other than as specifically described herein. The present disclosure is also defined in the following claims, and equivalents thereof.

What is claimed is:

1. A method for storing and utilizing one or more graphics states in a ring storage by a graphics processing unit (GPU), the method comprising:
   determining, by the GPU, that a new draw call is received;
   comparing, by the GPU, a state identity (ID) of a graphics state stored in the ring storage with a state ID of a graphics state associated with the new draw call;
   determining, by the GPU, if the ring storage has available space to store the graphics state associated with the new draw call;
   storing, by the GPU, the graphics state associated with the new draw call in the ring storage, based on determining that the ring storage has available space;
   determining, by the GPU, a location of a first valid entry of the graphic state by a first pointer and a last valid entry of the graphics state by a second pointer, the graphic state being associated with the new draw call stored in the ring storage; and
   collecting, by the GPU, data from one or more valid entries of the graphics state associated with the new draw call stored in the ring storage to complete a task associated with the new draw call.

2. The method of claim 1, wherein the method further comprising:

reusing, by the GPU, the graphics state stored in the ring storage for the new draw call based on determining that the state ID of the graphics state stored in the ring storage matches the state ID of the graphics state associated with the new draw call.

3. The method of claim 2, wherein the reused graphics state is used in a previous draw call, wherein a bandwidth of the GPU is magnified based on reusing the graphics state stored in the ring storage across two or more draw calls.

4. The method of claim 1, wherein storing, by the GPU, further comprising:
monitoring, by the GPU, a draw ID stream of the GPU for new incoming draw calls; and
storing, by the GPU, graphics states corresponding to the new incoming draw calls in the ring storage for future use by the GPU.

5. The method of claim 4, wherein the graphics states corresponding to the new incoming draw calls are stored in the ring storage in an order with which the graphics states are requested by a GPU sub-block for corresponding new incoming draw calls, and
wherein the graphics states corresponding to the new incoming draw calls are stored in the ring storage from a state cache of the GPU.

6. The method of claim 5, wherein the graphics states corresponding to the new incoming draw calls are stored in the ring storage at a first bandwidth, and the graphics states corresponding to the new incoming draw calls are stored in the state cache at a second bandwidth, wherein the first bandwidth is higher than the second bandwidth.

7. The method of claim 4, wherein the graphics states stored in the ring storage are read-only for the GPU.

8. The method of claim 1, wherein the method further comprises:
storing, by the GPU, one or more graphics states corresponding to one or more new incoming draw calls in a state cache of the GPU, based on determining that the ring storage does not have available space;
evicting, by the GPU, one or more graphics states from the state cache, the evicted one or more graphics states being different from the graphics states corresponding to the one or more new incoming draw calls; and
evicting from the ring storage, by the GPU, one or more non-default entries of one or more graphics states as they are loaded into the ring storage to create space for more graphics states.

9. The method of claim 8, wherein the one or more graphics states are evicted from the state cache based on determining that the one or more graphics states are stored in the ring storage.

10. A method comprising:
determining, by a graphics processing unit (GPU), that a ring storage of the GPU has available space to store one or more graphics states corresponding to one or more new incoming draw calls;
storing, by the GPU, the one or more graphics states corresponding to the one or more new incoming draw calls in the ring storage of the GPU;
determining, by the GPU, an active graphic state corresponding to an active draw call from among the one or more graphics states stored in the ring storage;
determining, by the GPU, a location of a first valid entry of the active graphic state by a first pointer and a last valid entry of the active graphic state by a second pointer, the active graphic state being associated with the active draw call; and
collecting, by the GPU, data from one or more valid entries of the active graphics state stored in the ring storage to complete a task associated with the active draw call.

11. The method of claim 10, wherein the one or more graphics states corresponding to the one or more new incoming draw calls are stored in the ring storage of the GPU in an order with which the one or more graphics states are requested by a GPU sub-block of the GPU for corresponding new incoming draw calls.

12. The method of claim 10, wherein the one or more graphics states corresponding to the one or more new incoming draw calls are stored in the ring storage from a state cache of the GPU.

13. The method of claim 12, wherein the one or more graphics states corresponding to the one or more new incoming draw calls are stored in the ring storage at a first bandwidth, and the one or more graphics states corresponding to the one or more new incoming draw calls are stored in the state cache at a second bandwidth, wherein the first bandwidth is higher than the second bandwidth.

14. The method of claim 10, wherein the one or more graphics states stored in the ring storage are read-only for the GPU.

15. The method of claim 10, further comprising:
reusing, by the GPU, a graphics state from among the one or more graphics states stored in the ring storage, for two or more draw calls, based on determining that a state identity (ID) of the graphics state matches a state ID of the graphics state associated with the two or more draw calls, wherein a bandwidth of the GPU is magnified based on reusing the graphics state stored in the ring storage across two or more draw calls.

16. The method of claim 10, further comprising:
storing, by the GPU, the one or more graphics states corresponding to the one or more new incoming draw calls in a state cache of the GPU based on determining that the ring storage does not have available space to store the one or more graphics states corresponding to the one or more new incoming draw calls;
evicting, by the GPU, a first plurality of graphics states from the state cache, the evicted first plurality of graphics states being different from the one or more graphics states corresponding to the one or more new incoming draw calls, based on determining that the first plurality of graphics states are stored in the ring storage; and
evicting from the ring storage, by the GPU, one or more non-default entries of one or more graphics states as they are loaded into the ring storage to create space for more graphics states.

17. A system comprising a graphics processing unit (GPU) in communication with a ring storage and a state cache, wherein the GPU is configured to:
compare a state identity (ID) of a graphics state stored in the ring storage with a state ID of a graphics state associated with a new draw call received by the GPU;
store the graphics state associated with the new draw call in the ring storage, based on determining that the ring storage has available space, the graphics state stored in the ring storage being read-only for the GPU;
determine a location of a first valid entry of the graphics state by a first pointer and a last valid entry of the graphics state by a second pointer, the graphics state being associated with the new draw call stored in the ring storage; and collect data from one or more valid entries of the graphics state associated with the new draw call stored in the ring storage to complete a task associated with the new draw call.

18. The system of claim 17, wherein the GPU is further configured to:
reuse the graphics state stored in the ring storage for the new draw call based on determining that the state ID of the graphics state stored in the ring storage matches the state ID of the graphics state associated with the new draw call, wherein the reused graphics state is used in a previous draw call, wherein a bandwidth of the GPU is magnified based on reusing the graphics state stored in the ring storage across two or more draw calls.

19. The system of claim 17, wherein the GPU is further configured to:
monitor a draw ID stream of the GPU for new incoming draw calls; and
store graphics states corresponding to the new incoming draw calls in the ring storage for future use by the GPU,
wherein the graphics states corresponding to the new incoming draw calls are stored in the ring storage in an order with which the graphics states are requested by a GPU sub-block for corresponding new incoming draw calls,
wherein the graphics states corresponding to the new incoming draw calls are stored in the ring storage from the state cache of the GPU, and
wherein the graphics states corresponding to the new incoming draw calls are stored in the ring storage at a first bandwidth, and the graphics states corresponding to the new incoming draw calls are stored in the state cache at a second bandwidth, wherein the first bandwidth is higher than the second bandwidth.

20. The system of claim 17, wherein the GPU is further configured to:
store one or more graphics states corresponding to one or more new incoming draw calls in the state cache of the GPU, based on determining that the ring storage does not have available space;
evict one or more graphics states from the state cache, the evicted one or more graphics states being different from the graphics states corresponding to the one or more new incoming draw calls, wherein the one or more graphics states are evicted from the state cache based on determining that the one or more graphics states are stored in the ring storage; and
evict from the ring storage, one or more non-default entries of one or more graphics states as they are loaded into the ring storage to create space for more graphics states.

* * * * *